United States Patent
Kanbara et al.

[11] Patent Number: 5,485,346
[45] Date of Patent: Jan. 16, 1996

[54] ELECTROLYTE FOR DRIVING ELECTROLYTIC CAPACITOR AND THE ELECTROLYTIC CAPACITOR

[75] Inventors: Teruhisa Kanbara, Ikeda; Yuichiro Tsubaki, Kyoto, both of Japan

[73] Assignee: Matsushita Electric Industrial Co., Ltd., Kadoma, Japan

[21] Appl. No.: 127,547

[22] Filed: Sep. 28, 1993

[30] Foreign Application Priority Data

Sep. 29, 1992 [JP] Japan ................................ 4-259567
Sep. 29, 1992 [JP] Japan ................................ 4-259568
Sep. 29, 1992 [JP] Japan ................................ 4-259569
Sep. 29, 1992 [JP] Japan ................................ 4-259570

[51] Int. Cl.$^6$ .................................................. H01G 9/02
[52] U.S. Cl. .......................... 361/504; 361/506; 361/527
[58] Field of Search .................................. 361/505, 527, 361/506, 504; 252/62.2, 579; 429/194, 198; 562/480, 493, 590, 595

[56] References Cited

U.S. PATENT DOCUMENTS

| | | | |
|---|---|---|---|
| 4,715,976 | 12/1987 | Mori | 252/62.2 |
| 4,734,821 | 3/1988 | Morimoto | 252/62.2 |
| 4,786,429 | 11/1988 | Mori | 252/62.2 |
| 4,915,861 | 4/1990 | Yokoyama et al. | 252/62.2 |
| 4,970,012 | 11/1990 | Kuroda | 252/62.2 |
| 5,055,974 | 10/1991 | Washio | 361/527 |
| 5,177,673 | 1/1993 | Nagara | 361/527 |
| 5,388,026 | 2/1995 | Kanbara | 361/525 |

FOREIGN PATENT DOCUMENTS

| | | |
|---|---|---|
| 104703 | 4/1984 | European Pat. Off. . |
| 251577 | 1/1988 | European Pat. Off. . |
| 405181 | 1/1991 | European Pat. Off. . |
| 62-264615 | 11/1987 | Japan . |
| 63-142061 | 6/1988 | Japan . |
| 63-181413 | 7/1988 | Japan . |
| 1160005 | 6/1989 | Japan . |

(List continued on next page.)

OTHER PUBLICATIONS

Patent Abstract of Japan, vol. 15, No. 14, (E1022), Jan. 1991 re JP-A 2264414.
Patent Abstract of Japan, vol. 13, No. 92 (E722), Mar. 1989 re JP-A 63268224.
Patent Abstract of Japan, vol. 14, No. 234 (E0929), May 1990 re JP-A 2063108.
Chandra et al., "Studies on Ammonium Perchlorate Doped Polyethylene Oxide Polymer Eletrolyte", Solid State Ionics, (1990), pp. 651–654.
Dervant Abstract No. 90–086467, Jul. 1988 re JP-A 2-038451.

*Primary Examiner*—Bot L. Ledynh
*Attorney, Agent, or Firm*—Cushman, Darby & Cushman

[57] ABSTRACT

An electrolyte for driving an electrolytic capacitor comprising an organic solvent, at least one ammonium carboxylate and, at least one solute selected from the group consisting of quaternary ammonium borates and quaternary ammonium phosphates. An electrolyte further containing a polymer is disclosed. The polymer includes a polyether polyol represented by the following formula:

$$\begin{aligned}
&CH_2-O-[(C_2H_4O)l_1-(C_3H_6O)m_1]n1-R_1 \\
&CH-O-[(C_2H_4O)l_2-(C_3H_6O)m_2]n_2-R_2 \\
&CH_2-O-[(C_2H_4O)l_3-(C_3H_6O)m_3]n_3-R_3
\end{aligned}$$

where, $l_1$, $l_2$, $l_3$, $m_1$, $m_2$, $m_3$, $n_1$, $n_2$, and $n_3$ are positive integers, and $2 \leq (l_1+ m_1) \times n_1 \leq 50$, $2 \leq (l_2 +m_2) \times n_2 \leq 50$ and $2 \leq (l_3+ m_3) \times n_3 \leq 50$, and $R_1$, $R_2$ and $R_3$ independently represents a hydrogen atom, which may be substituted one another by the same or different isocyanate residue or acrylic residue, wherein each end of the isocyanate residue or acrylic residue may be three-dimensionally linked.

16 Claims, 1 Drawing Sheet

FOREIGN PATENT DOCUMENTS

| | | |
|---|---|---|
| 266920 | 3/1990 | Japan . |
| 2263422 | 10/1990 | Japan . |
| 2277208 | 11/1990 | Japan . |
| 2312218 | 12/1990 | Japan . |
| 325912 | 2/1991 | Japan . |
| 3120808 | 5/1991 | Japan . |
| 3241811 | 10/1991 | Japan . |
| 468064 | 3/1992 | Japan . |
| 4284613 | 10/1992 | Japan . |
| WO8808612 | 11/1988 | WIPO . |
| WO9106585 | 5/1995 | WIPO . |

ELECTROLYTE FOR DRIVING ELECTROLYTIC CAPACITOR AND THE ELECTROLYTIC CAPACITOR

FIELD OF THE INVENTION AND RELATED ART STATEMENT

1. Field of the Invention

The present invention relates to an electrolyte for driving an electrolytic capacitor, and more particularly, to an electrolyte containing a specific quaternary ammonium salt and giving an electrolytic capacitor of low impedance and an improved working voltage characteristics, and an electrolytic capacitor using such an electrolyte.

2. Description of the Related Art

Conventionally, an electrolyte for driving a high voltage electrolytic capacitor having a working voltage of 300V or more is constituted by, a solvent composed mainly of ethylene glycol and a solute composed mainly of carboxylate and a small amount of boric acid and ammonium borate added thereto.

An electrolyte for driving a low voltage electrolytic capacitor of 50V or less is generally constituted by a polar organic solvent having a high dielectric constant such as τ-butyrolactone and a solute composed mainly of organic ammonium salts, and a small amount of boric acid, phosphoric acid and ammonium borate added thereto.

The electrolytic capacitor generally comprises an anode provided with a dielectric layer consisting of an oxide such as aluminum oxide or the like, an electrically conductive cathode and an electrolyte interposed between the anode and the cathode. As the electrolyte, an organic electrolyte or the like prepared by dissolving ammonium salts in the high boiling temperature organic solvent such as ethylene glycol and τ-butyrolactone is used.

Since there is the possibility of leakage and evaporation of the electrolyte in the capacitor using the liquid electrolyte, it has been proposed to use, instead of the liquid electrolyte, an ionic conductive polymer electrolyte containing an alkali metal salt dissolved in a base polymer consisting of a mixture of siloxane-alkylene oxide copolymer and polyethylene oxide. Thereby, the electrolytic capacitor elements are made solid state like.

However, the electrolytic capacitor using the ionic conductive polymer electrolyte with alkali metal ions has a drawback in that, alkali metal ions are liable to diffuse into a dielectric layer of the electrolytic capacitor. In such a case, the thus diffused alkali metal ions might sometimes cause to lower the dielectric constant of the dielectric layer, and finally invite a short-circuit in the capacitor.

In order to solve such problems, it has been considered to use ammonium ions instead of such alkali metal ions as the mobile ions of the electrolyte. However, it is generally known that the ammonium ion conductive polymer electrolyte has a very low conductivity (S. Chandra et al., Solid States Ionics, 49/41(1990)p. 651).

The electrolyte of the electrolytic capacitor acts as an impedance of the capacitor, and when the ionic conductivity of the electrolyte is too small, the impedance of the capacitor becomes larger and it is practically difficult to use.

From such point of view, after studying a base polymer, ammonium salts and plasticizers (organic solvents), the inventors have proposed an electrolytic capacitor using a highly practical polymer electrolyte.

Though a sparking voltage becomes higher above 500V, when the conventional high voltage electrolyte is used, the electrical conductivity of the electrolyte is such low as about $1\times10^{-3}$ S/cm. And hence, the impedance of the capacitor becomes higher. On the other hand, the conventional low voltage electrolyte has a high electrical conductivity of $1\times10^{-2}$ S/cm, and hence the impedance of the capacitor becomes low, but the sparking voltage is only below around 100V. Boric acid, phosphoric acid and ammonium borate serving as additives for improving the working voltage are difficult to dissolve in polar organic solvents. And hence even when the additives are added to the low voltage electrolyte having a high electric conductivity, the sparking voltage of the latter does not reach the sparking voltage of the high voltage electrolyte by such adding of additives. That is, the impedance and working voltage of the aluminum electrolytic capacitor are usually in a reciprocal relation, thus it was difficult to maintain two characteristics of low impedance and high working voltage at the same time.

The electrolytic capacitor by the polymer electrolyte of the aforementioned proposal is that, the impedance and the working voltage are in a reciprocal relation by the amount of ammonium salts and polar organic solvents constituting the polymer electrolyte, thus it was difficult to maintain two characteristics of low impedance and high working voltage at the same time.

OBJECT AND SUMMARY OF THE INVENTION

It is, therefore, an object of the present invention to provide an electrolyte for driving an electrolytic capacitor, which electrolyte gives an electrolytic capacitor a low impedance and a high working voltage.

It is another object of the present invention to provide a polymer electrolyte for driving an electrolytic capacitor, which electrolyte gives an electrolytic capacitor a low impedance and a high working voltage.

It is a further object of the present invention to improve the working voltage and to largely reduce the impedance of a high voltage electrolytic capacitor.

It is a still further object of the present invention to largely improve the working voltage and to reduce the impedance of a low voltage electrolytic capacitor.

According to the present invention, there is provided an electrolyte for driving an electrolytic capacitor comprising an organic solvent, at least one ammonium carboxylate, and at least one solute selected from the group consisting of quaternary ammonium borates and quaternary ammonium phosphates.

According to the present invention, there is provided an electrolyte for driving an electrolytic capacitor comprising an organic solvent and at least one quaternary ammonium carboxylate.

Furthermore, according to the present invention, there is provided an electrolyte for driving an electrolytic capacitor comprising an organic solvent, at least one ammonium carboxylate, at least one solute selected from the group consisting of quaternary ammonium borates and quaternary ammonium phosphates, and a polymer including a polyether polyol represented by the Formula I, as a skeletal structure, wherein a polyether portion of said polyether polyol is a random copolymer of oxyethylene and oxypropylene:

Formula I;

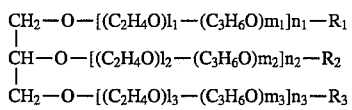

where, $l_1, l_2, l_3, m_1, m_2, m_3, n_1, n_2,$ and $n_3$ are positive integers, and $2 \leq (l_1+m_1) \times n_1 \leq 50$, $2 \leq (l_2+m_2) \times n_2 \leq 50$ and $2 \leq (l_3+m_3) \times n_3 \leq 50$, and $R_1, R_2$ and $R_3$ independently represents a hydrogen atom, which may be substituted one another by the same or different isocyanate residue or acrylic residue, wherein each end of the isocyanate residue or the acrylic residue may be three-dimensionally linked.

According to the present invention, there is provided an electrolyte for driving an electrolytic capacitor comprising an organic solvent, at least one quaternary ammonium carboxylate, and a polymer including a polyether polyol represented by the foregoing Formula I as a skeletal structure, wherein a polyether portion of said polyether polyol is a random copolymer of oxyethylene and oxypropylene.

In the above-defined electrolyte for driving an electrolytic capacitor, said polyether polyol may have isocyanate redisues, whose ends are preferably three-dimensionally linked.

In the above-defined electrolyte for driving an electrolytic capacitor, said polyether polyol may alternately have acrylic residues, whose ends are preferably linked by irradiation with ultraviolet beams, electron beams or the like, if necessary.

An electrolytic capacitor of the present invention comprises an anode having a dielectric layer consisting of aluminum oxide, an electrically conductive cathode, and an ion-permeable separator and an electrolyte interposed between the electrodes, said electrolyte containing an organic solvent, at least one ammonium carboxylate, and at least one solute selected from the group consisting of quaternary ammonium borates and quaternary ammonium phosphates.

An electrolytic capacitor of the present invention comprises an anode having a dielectric layer consisting of aluminum oxide, an electrically conductive cathode, and an electrolyte interposed between the electrodes, said electrolyte containing an organic solvent and at least one quaternary ammonium carboxylate.

An electrolytic capacitor of the present invention comprises an anode having a dielectric layer consisting of aluminum oxide, an electrically conductive cathode, and an electrolyte interposed between the electrodes, said electrolyte containing a polymer including a polyether polyol represented by the foregoing Formula I as a skeletal structure, wherein a polyether portion of said polyether polyol is a random copolymer of oxyethylene and oxypropylene.

Hereupon, the organic solvent constituting the electrolyte is preferably at least one polar organic solvent selected from the group consisting of monoethylene glycol, diethylene glycol, triethylene glycol, tetraethylene glycol, polyethylene glycol; polyalkylene glycol dimethylether such as polymethylene glycol dimethylether, polyethylene glycol dimethylether, polypropylene glycol dimethylether, polybutylene glycol dimethylether; τ-butyrolactone, propylene carbonate, ethylene carbonate, sulforan, dimethyl carbonate and dimethylethane.

The quaternary ammonium borate is preferably tetraalkylammonium borate whose alkyl group having from one to four carbon atoms such as tetramethylammonium borate, tetraethylammonium borate, tetrapropylammonium borate, tetrabutylammonium borate and the like.

Furthermore, the quaternary ammonium phosphate is preferably tetraalkylammonium phosphate whose alkyl group having from one to four carbon atoms such as tetraethylammonium phosphate, tetramethylammonium phosphate, tetrapropylammonium phosphate, tetrabutylammonium phosphate and the like.

The number of quaternary ammonium groups contained in these tetraalkylammonium borate and tetraalkylammonium phosphate is, usually 1 or 2.

Examples of such borates and phosphates are tetraalkylammonium dihydrogen borate, tetraalkylammonium dihydrogen phosphate, di-tetraalkylammonium hydrogen borate and di-tetraalkylammonium hydrogen phosphate represented by the formula $R_4NH_2BO_3$, $R_4NH_2PO_4$, $[R_4N]_2HBO_3$ and $[R_4N]_2HPO_4$ respectively, where R represents an alkyl group having from one to four carbon atoms.

Particularly, preferable examples of ammonium carboxylate used as the solute together with the aforementioned ammonium borate and/or ammonium phosphate are ammonium adipate, ammonium azelate and ammonium benzoate.

Suitable concentrations of these solutes in the electrolyte are, 5 to 20 weight % for ammonium carboxylate, 1 to 20 weight % for quaternary ammonium borate and quaternary ammonium phosphate, and totally 6 to 30 weight %.

When a polymer including a polyether polyol represented by the foregoing Formula I as a skeletal structure is added to the electrolyte and in that polymer a polyether portion of said polyether polyol is a copolymer of oxyethylene and oxypropylene, the amount of the polymer is preferably 5 to 80 weight % in the electrolyte containing the polymer, or a total amount consisting of the organic solvent, the solute and the polymer.

The inventors have found out that, these quaternary ammonium borate and quaternary ammonium phosphate are chemically stable and have a good solubility against the polar organic solvents such as τ-butyrolactone and diethylene glycol, and when adding these together with the ammonium carboxylate, the working voltage is remarkably improved while keeping a high conductivity. Moreover, we have found out that, those having crystal water among the ammonium salts are remarkable in this effect.

When the polymer including a polyether polyol represented by the foregoing Formula I as a skeletal structure, wherein a polyether portion of said polyether polyol is a random copolymer of oxyethylene and oxypropylene is added, the working voltage can be improved remarkably.

Though the quaternary ammonium borate and quaternary ammonium phosphate are effective in improving the working voltage as the additives of the electrolyte, their mechanisms are different from each other. That is, when the quaternary ammonium phosphate is added to the electrolyte, it reacts with aluminum oxide $Al_2O_3$ of the dielectric layer of the capacitor to form a film of $Al_{2-x}P_xO_3$ ($0 < x \leq 0.3$), and thereby, the working voltage is improved. While, the quaternary ammonium borate will not produce such a film.

Different from the quaternary ammonium borate and quaternary ammonium phosphate, the quaternary ammonium carboxylate provides the electrolyte of low impedance and high working voltage by using it independently as the solute. The quaternary ammonium carboxylate is preferably tetraalkylammonium salts of adipic acid, azelaic acid and decandicarboxlic acid, and those with alkyl group having from one to four carbon atoms are preferable.

Further, a tetraalkylammonium salt of benzoic acid may be utilized as the quaternary ammonium carboxylate, and salts with alkyl group having from one to four carbon atoms are preferable.

Preferable concentration of the quaternary ammonium carboxylate in the electrolyte is 5 to 20 weight %. Other solutes may be added by 1 to 20 weight %, in that case, 6 to 30 weight % is preferable in total.

When a polymer including a polyether polyol represented by the foregoing Formula I as a skeletal structure is added to the electrolyte and in that polymer a polyether portion of said polyether polyol is a copolymer of oxyethylene and oxypropylene, the amount of the polymer is preferably 5 to 80 weight % in the electrolyte containing the polymer, or a total amount consisting of the organic solvent, the solute and the polymer.

While the novel features of the invention are set forth particularly in the appended claims, the invention, both as to organization and content, will be better understood and appreciated, along with other objects and features thereof, from the following detailed description taken in conjunction with the drawings.

Figure 1:
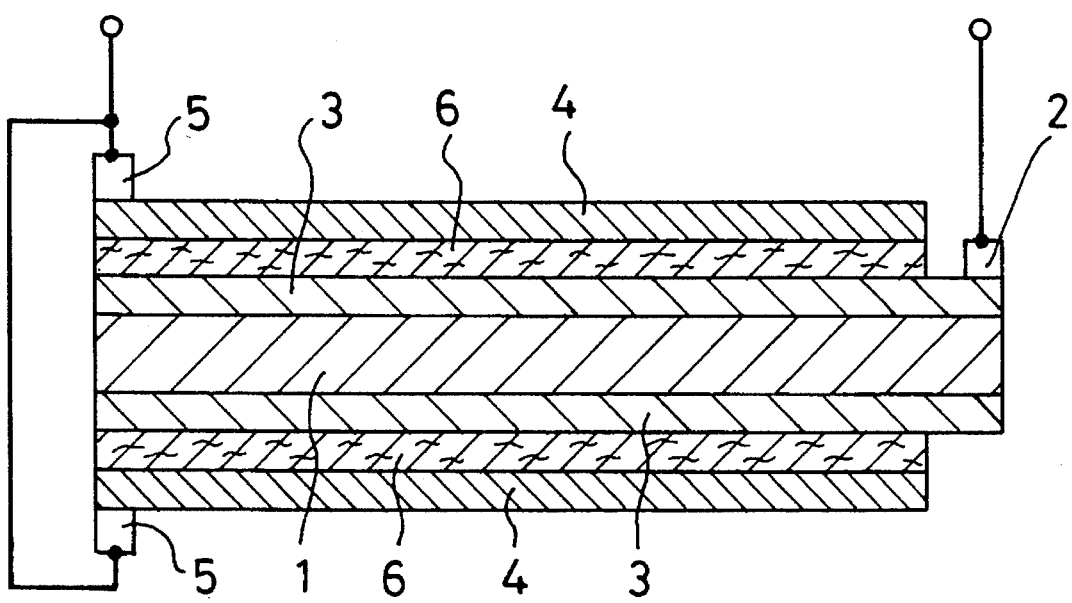
FIG. 1 is a longitudinal sectional view of an aluminum electrolytic capacitor element used in one embodiment of the present invention.

It will be recognized that the FIGURE is a schematic representation for a purpose of illustration and do not necessarily depict the actual relative sizes or locations of the elements shown.

DESCRIPTION OF THE PREFERRED EMBODIMENTS

In the following, the preferred embodiments of the present invention are described in detail together with comparative examples.

EMBODIMENT 1

An electrolyte for driving an electrolytic capacitor having a composition shown in Table 1 is prepared and impregnated into an aluminum electrolytic capacitor element with a rated voltage of 35 V and a capacity of 56 μF. The capacitor element is made by winding in lamination an anode consisting of an aluminum foil whose surface is positively oxidized, a cathode consisting of the aluminum foil and a separator or separators for separating the anode and the cathode into a roll, and the roll is inserted into a metal case, thereby to form a capacitor by injecting an electrolyte under a vacuum. Each solute concentration listed in Table 1 is that used based on the weight of the electrolyte. Characteristics of capacitors using respective electrolytes are shown in Table 2.

In Table 1, PEO-PPO represents a polymer represented by the following formula:

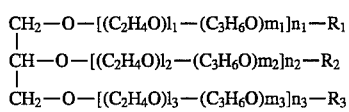

where, $(l_1 + m_1) \times n_1$, $(l_2 + m_2) \times n_2$ and $(l_3 + m_3) \times n_3$ are approximately 25 on an average, respectively, and $R_1$, $R_2$ and $R_3$ are isocyanate residues whose ends are not three-dimensionally linked.

Polyethylene glycol utilized in this Embodiment is a mixture composed of varied Polyethylene glycols having from one to six $—(OC_2H_4)—$ units.

A sparking voltage represents the voltage measured across the anode and the cathode at the time immediately before producing sparks, when a constant current of 1.2 mA is applied between the anode and cathode with the anode side of the capacitor element being made positive. A leakage current is measured between the anode and cathode after five minutes from applying the sparking voltage between the anode and cathode. Impedances are measured at a temperature of 20° and a frequency of 120 Hz.

From Table 2, it is understood that the sparking voltage is improved remarkably by using the electrolyte of the present invention.

TABLE 1

| Example Nos. | Solvents | Solutes | Solute Concentration (weight %) |
|---|---|---|---|
| 1.0 (Comparative example) | γ-butyrolactone | Ammonium adipate Boric acid | 10 1.4 |
| 1.1 | γ-butyrolactone | Ammonium adipate $(C_2H_5)_4NH_2BO_3$ | 10 10 |
| 1.2 | γ-butyrolactone | Ammonium adipate $(C_2H_5)_4NH_2BO_3.2H_2O$ | 10 10 |
| 1.3 | γ-butyrolactone | Tetraethylammonium phthalate $(C_2H_5)_4NH_2BO_3$ PEO-PPO | 10 10 5 |
| 1.4 | γ-butyrolactone Diethylene glycol (mixture of 1:1 by weight) | Ammonium adipate $(C_4H_9)_4NH_2BO_3$ | 10 10 |
| 1.5 | γ-butyrolactone Polyethylene glycol (mixture of 1:1 by weight) | Ammonium adipate $[(CH_3)_4N]_2$ $HBO_3.2H_2O$ PEO-PPO | 10 10 5 |

TABLE 2

| Example Nos. | Sparkling voltage (V) | Impedance (Ω) | Leakage current (μA) |
|---|---|---|---|
| 1.0 | 50 | 0.1 | 4 |
| 1.1 | 100 | 0.08 | 2 |
| 1.2 | 150 | 0.07 | 2 |
| 1.3 | 200 | 0.12 | 1 |
| 1.4 | 100 | 0.05 | 2 |
| 1.5 | 200 | 0.12 | 0.5 |

EMBODIMENT 2

An electrolyte for driving an electrolytic capacitor having a composition shown in Table 3 is prepared, and an aluminum electrolytic capacitor with a rated voltage of 35V and a capacity of 56 μF is constructed in the same manner as that in Embodiment 1. Characteristics of capacitors using respective electrolytes are shown in Table 4.

In the Table 3, PEO-PPO represents the same polymer as that used in Embodiment 1. Polyethylene glycol is the same mixture as that used in Embodiment 1.

It is understood from Table 4 that the sparking voltage is improved remarkably by using the electrolyte of the present invention.

TABLE 3

| Example Nos. | Solvents | Solutes | Solute Concentration (weight %) |
|---|---|---|---|
| 2.0 (comparative example) | γ-butyrolactone | Ammonium adipate<br>Boric acid | 10<br>1.4 |
| 2.1 | γ-butyrolactone | Ammonium adipate<br>$(C_2H_5)_4NH_2PO_4$ | 10<br>5 |
| 2.2 | γ-butyrolactone | Ammonium adipate<br>$(C_2H_5)_4NH_2PO_4.2H_2O$ | 10<br>5 |
| 2.3 | γ-butyrolactone | Tetraethylammonium phthalate<br>$(C_2H_5)_4NH_2PO_4$<br>PEO-PPO | 10<br>5<br>5 |
| 2.4 | γ-butyrolactone<br>Diethylene glycol<br>(mixture of 1:1 by weight) | Ammonium adipate<br>$(C_4H_9)_4NH_2PO_4$ | 10<br>5 |
| 2.5 | γ-butyrolactone<br>Polyethylene glycol<br>(mixture of 1:1 by weight) | Ammonium adipate<br>$[(CH_3)_4N]_2HBO_4.2H_2O$<br>PEO-PPO | 10<br>5<br>5 |

TABLE 4

| Example Nos. | Sparkling voltage (V) | Impedance (Ω) | Leakage current (μA) |
|---|---|---|---|
| 2.0 | 50 | 0.1 | 4 |
| 2.1 | 100 | 0.08 | 2 |
| 2.2 | 150 | 0.07 | 2 |
| 2.3 | 200 | 0.12 | 1 |
| 2.4 | 100 | 0.05 | 2 |
| 2.5 | 200 | 0.12 | 0.5 |

EMBODIMENT 3

An electrolyte for driving an electrolytic capacitor having a composition shown in Table 5 is prepared, and an aluminum electrolytic capacitor with a rated voltage of 450V and a capacity of 15 μF is constructed in the same manner as that in Embodiment 1. Characteristics of capacitors using respective electrolytes are shown in Table 6.

In the Table 5, PEO-PPO represents the same polymer as that used in Embodiment 1.

From Table 6, it is understood that a high working voltage and low impedance are performed by using the electrolyte of the present invention.

TABLE 5

| Example Nos. | Solvents | Solutes | Solute Concentration (weight %) |
|---|---|---|---|
| 3.0 (comparative example) | Diethylene glycol | Ammonium benzoate<br>Ammonium borate<br>Ammonium azelate | 2<br>2<br>6 |
| 3.1 | Diethylene glycol | Tetraethylammonium benzoate<br>Ammonium borate | 10<br>2 |
| 3.2 | Diethylene glycol | Tetraethylammonium benzoate<br>Ammonium borate | 10<br>2 |
| 3.3 | Diethylene glycol | Tetraethylammonium benzoate<br>Tetramethylammonium paranitrobenzoate<br>Ammonium borate | 10<br>10<br>2 |
| 3.4 | Diethylene glycol | Tetraethylammonium azelate<br>PEO-PPO | 10<br>10 |
| 3.5 | Diethylene glycol | Tetraethylammonium 5,6-decandicarboxylate<br>Ammonium borate<br>PEO-PPO | 5<br>2<br>5 |
| 3.6 | Diethylene glycol | Tetraethylammonium 5,6-decandicarboxylate | 10 |

TABLE 6

| Example | Sparkling voltage (V) | Impedance (Ω) | Leakage current (μA) |
|---|---|---|---|
| 3.0 | 490 | 90 | 5 |
| 3.1 | 520 | 40 | 3 |
| 3.2 | 520 | 40 | 2 |
| 3.3 | 540 | 30 | 1 |
| 3.4 | 580 | 50 | 2 |
| 3.5 | 580 | 30 | 1 |
| 3.6 | 550 | 40 | 2 |

EMBODIMENT 4

FIG.1 is a sectional view showing a configuration of an electrolytic capacitor of this embodiment.

Numeral 1 designates an anode made of an aluminum foil with a thickness of 0.1 mm and a size of 2.5 cm×5 cm. A connector 2 is spot-welded on one surface of the anode 1. After forming pits with diameters of about 1 to 5 μm on both surfaces of the anode by etching, the anode is dipped into a boric acid solution (concentration 80 g/l) kept at a temperature of 90° for 15 minutes for positive oxidation by using a current of 100 mA, thereby to form dielectric layers 3 constituted by aluminum oxide.

Numeral 4 designates cathodes made of aluminum foils with a thickness of 0.1 mm and a size of 2.5 cm×5 cm. A connector 5 is spot-welded on one surface of the cathode. The cathodes 4 have etching pits with a diameter of about 1 to 5 μ m formed on the surface thereof.

Numeral 6 designates separators interposed between the anode and cathodes, and these are made of polypropylene films containing polymer electrolytes.

The electrolytic capacitor A of this embodiment having the above-mentioned structure is produced as follows; A base polymer employed in this embodiment for a polymer electrolyte is a polymer represented by the following formula:

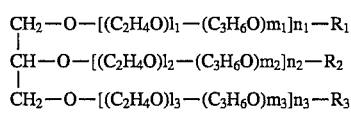

where, $(1_1 + m_1) \times n_1$, $(1_1 + m_2) \times n_2$ and $(1_3 + m_3) \times n_3$ are approximately 25 on an average, respectively, and $R_1$, $R_2$ and $R_3$ are isocynate residues.

First, a polymer electrolyte solution is prepared by intimately mixing with stirring a mixture of 10 g of the above-mentioned base polymer, 2.4 g of ammonium borodisalicylate, 1.2 g of di-tetraethylammonium hydrogen borate monohydrate represented by the chemical formula $[(C_2H_5)_4N]_2HBO_3 \cdot H_2O$, 10 g of diethylene glycol as a solvent and 20 g of n-butanone as a diluent.

The electrolyte solution is impregnated to the separators made of polypropylene films with a thickness of 0.1 mm, a size of 3 cm × 4 cm and a porosity of 50%. And the impregnated separators are adhered by pressure to the dielectric layers of the anode, and the cathodes are adhered to the other faces of the separators. Thus, the separators are sandwiched between the anode and cathodes.

The obtained assembly is exposed for 12 hours in air at a temperature of 30° and a humidity of 60%, thereby to cross link the isocynate residues of the base polymer and to cure the electrolyte solution.

Thus, an aluminum electrolytic capacitor A of this embodiment having an effective area of 20 cm² is prepared.

Next, as its comparative example, an aluminum electrolytic capacitor B is prepared by using a polymer electrolyte solution prepared without adding di-tetraethylammonium hydrogen borate monohydrate. A process of producing the aluminum electrolytic capacitor B of the comparative example and its constituent materials are exactly similar to the aluminum electrolytic capacitor A of the embodiment, except for not adding the di-tetraethylammonium hydrogen borate monohydrate.

For the electrolytic capacitor A of the embodiment and the electrolytic capacitor B of the comparative example prepared by the aforesaid process, the impedance at a temperature of 20° and a frequency of 120 Hz, the electrostatic capacity, the tangent of the loss angle (tan δ), the equivalent series resistance, the sparking voltage and the leakage current are measured, and the results are shown in table 1. The sparking voltages in the table represent the voltage measured across the connectors 2 and 5 at the time immediately before producing sparks, when the constant current of 1.2 mA is applied between the connectors 2 and 5 with the anode side connector 2 being made positive.

The leakage current are measured between the connectors 2 and 5 after five minutes from applying the sparking voltage between the connectors with the anode side connector 2 being positive.

As the result of evaluation shown in Table 7, the following is understood. The capacitor A of the embodiment is that, as compared with the capacitor B of the comparative example, the sparking voltage is improved remarkably and the leakage current is largely reduced. This is believed that, addition of the tetraethylammonium borate monohydrate to the polymer electrolyte has improved the self-restoring function of the anode dielectric layer.

TABLE 7

|  | Capacitor A | Capacitor B |
|---|---|---|
| Impedance (Ω) | 300 | 330 |
| Electrostatic Capacity (μF) | 4.2 | 4.2 |
| tan δ | 0.08 | 0.08 |
| Equivalent Series Resistance (Ω) | 36 | 46 |
| Sparkling Voltage (V) | 500 | 300 |
| Leakage Current (μA) | 1.2 | 5.0 |

EXAMPLE 5

In the Embodiment 4, though the effect of adding tetraethylammonium borate to the polymer electrolyte is shown, the same effect is also obtained in other quaternary ammonium salts.

In this embodiment, electrolytic capacitors are produced in the same manner as in Embodiment 4 except that kinds and amounts of solvents and solutes as shown in Table 8 are used. Each amount of solutes shown in Table 8 is that to be used per 10 g of the base polymer. Polypropylene glycol dimethylether is a mixture composed of varied polypropylene glycol dimethylethers having from one to six —($OC_3H_6$)— units. Polyethylene glycol is the same mixture as that used in Embodiment 1.

The impedances and sparking voltages of the capacitors measured at the same condition as the Embodiment 4 are shown in table 9.

From the result, it is understood that a specific electrolyte according to the present invention is effective both for lowering the impedance and increasing the working voltage of the aluminum electrolytic capacitor.

TABLE 8

| Samples | Solvents (g) | Solutes (g) |
|---|---|---|
| C | Triethylene glycol (30) | 5,6-decandicarboxilic acid (1.2)<br>Tetraetylammonium bezoate (1.2) |
| D | Tetraethylene glycol (20) | Tetraethylammonium borodisalicylate (2.4)<br>$[(C_2H_5)_4N]_2HBO_3 \cdot H_2O$ (2.4) |
| E | Polyethylene glycol (30) | Ammonium γ-resorcylate (3.6)<br>$(C_3H_7)_4NH_2BO_3H_2O$ (1.2) |
| F | Polypropylene glycol dimethylether (30) | Ammonium borodisalicylate monohydrate (2.4)<br>Tetraethylammonium 5,6-decandicarboxylate (1.2) |
| G | γ-butyrolactone (10)<br>Ethylene glycol (10) | Tetraethylammonium phthalate (1.2)<br>$(C_2H_5)_4NH_2PO_4 \cdot 2H_2O$ (1.2) |
| H | Propylene carbonate (10)<br>Ethylene carbonate (10)<br>Diethyl carbonate (10) | Tetrabutylammonium azelate (1.2)<br>$[(C_2H_5)_4N]_2HBO_3 \cdot H_2O$ (1.2) |
| I | Sulforan (10)<br>Dimethylethane (10) | Ammonium γ-resorcylate (2.4)<br>$(CH_3)_4NH_2BO_3$ (0.6) |

TABLE 9

| | Characteristics | |
|---|---|---|
| Samples | Impedance (Ω) | Sparking Voltage (V) |
| C | 500 | 600 |
| D | 350 | 500 |
| E | 370 | 520 |
| F | 400 | 530 |
| G | 280 | 500 |

TABLE 9-continued

| Samples | Characteristics | |
|---|---|---|
| | Impedance (Ω) | Sparking Voltage (V) |
| H | 270 | 520 |
| I | 320 | 520 |

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An electrolyte for driving an electrolytic capacitor comprising an organic solvent, at least one ammonium carboxylate, at least one solute selected from the group consisting of quaternary ammonium borates and quaternary ammonium phosphates, and a polymer including a polyether polyol represented by the following formula as a skeletal structure wherein a polyether portion of said polyether polyol is a random copolymer of oxyethylene and oxypropylene:

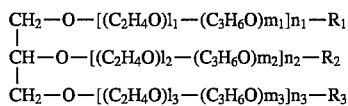

where, $l_1$, $l_2$, $l_3$, $m_1$, $m_2$, $m_3$, $n_1$, $n_2$ and $n_3$ are positive integers, and $2 \leq (l_1 + m_1) \times n_1 \leq 50$, $2 \leq (l_2 + m_2) \times n_2 \leq 50$ and $2 \leq (l_3 + m_3) \times n_3 \leq 50$, and $R_1$, $R_2$ and $R_3$ independently represents a hydrogen atom, which may be substituted one another by the same or different isocyanate residue or acrylic residue, wherein each end of the isocyanate residue or acrylic residue may be three-dimensionally linked.

2. An electrolyte for driving an electrolytic capacitor comprising an organic solvent, at least one quaternary ammonium carboxylate, and a polymer including a polyether polyol represented by the following formula as a skeletal structure, wherein a polyether portion of said polyether polyol is a random copolymer of oxyethylene and oxypropylene:

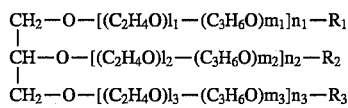

where, $l_1$, $l_2$, $l_3$, $m_1$, $m_2$, $m_3$, $n_1$, $n_2$ and $n_3$ are positive integers, and $2 \leq (l_1 + m_1) \times n_1 \leq 50$, $2 \leq (l_2 + m_2) \times n_2 \leq 50$ and $2 \leq (l_3 + m_3) \times n_3 \leq 50$, and $R_1$, $R_2$ and $R_3$ independently represents a hydrogen atom, which may be substituted one another by the same or different isocyanate residue or acrylic residue, wherein each end of the isocyanate residue or acrylic residue may be three-dimensionally linked.

3. An electrolyte for driving an electrolytic capacitor in accordance with either of claim 1, wherein an organic solvent is at least one selected from the group consisting of monoethylene glycol, diethylene glycol, triethylene glycol, tetraethylene glycol, polyethylene glycol, polyalkylene glycol dimethylether, τ-butyrolactone, propylene carbonate, ethylene carbonate, sulforan, dimethyl carbonate and dimethylethane.

4. An electrolyte for driving an electrolytic capacitor in accordance with claim 1, wherein the quaternary ammonium borate is quaternary alkylammonium borate whose alkyl group having from one to four carbon atoms.

5. An electrolyte for driving an electrolytic capacitor in accordance with claim 1, wherein the quaternary ammonium phosphate is quaternary alkylammonium phosphate whose alkyl group having from one to four carbon atoms.

6. An electrolyte for driving an electrolytic capacitor in accordance with claim 1, wherein said ammonium carboxylate is an ammonium salt of an acid selected from the group consisting of adipic acid, azelaic acid and benzoic acid.

7. An electrolyte for driving an electrolytic capacitor in accordance with claim 2, wherein said quaternary ammonium carboxylate is a quaternary alkylammonium salt of an acid selected from the group consisting of adipic acid, benzoic acid, azelaic acid and decandicarboxylic acid, and an alkyl group of said quaternary alkylammonium salt has from one to four carbon atoms.

8. An electrolyte for driving an electrolytic capacitor in accordance with claim 1 or claim 2, wherein the concentration of said polymer in the electrolyte is 5 to 80 weight %.

9. An electrolytic capacitor comprising:

an anode having a dielectric layer consisting of aluminum oxide;

an electric conductive cathode; and an electrolyte interposed between the electrodes, said electrolyte containing an organic solvent, at least one ammonium carboxylate and at least one solute selected from the group consisting of quaternary ammonium borates and quaternary ammonium phosphate, wherein said quaternary ammonium borate and/or quaternary ammonium phosphate include crystal water.

10. An electrolytic capacitor comprising:

an anode having a dielectric layer consisting of aluminum oxide;

an electric conductive cathode; and an electrolyte interposed between the electrodes, said electrolyte containing an organic solvent, at least one ammonium carboxylate, at least one solute selected from the group consisting of quaternary ammonium borates and quaternary ammonium phosphate, and a polymer including a polyether polyol represented by the following formula as a skeletal structure, wherein a polyether portion of said polyether polyol is a random copolymer of oxyethylene and oxypropylene:

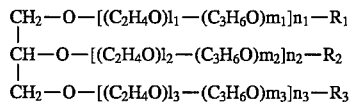

where, $l_1$, $l_2$, $l_3$, $m_1$, $m_2$, $m_3$, $n_1$, $n_2$, and $n_3$ are positive integers, and $2 \leq 50$ and $2 \leq (l_1 + m_1) \times n_1 \leq 50$, $2 \leq (l_2 + m_2) \times n_2 \leq 50$ and $2 \leq (l_3 + m_3) \times n_3 \leq 50$, and $R_1$, $R_2$ and $R_3$ independently represents a hydrogen atom, which may be substituted one another by the same or different isocyanate residue or acrylic residue, wherein each end of the isocyanate residue or acrylic residue may be three-dimensionally linked.

11. An electrolytic capacitor comprising an anode having a dielectric layer consisting of aluminum oxide, an electric conductive cathode, and an electrolyte interposed between the electrodes, said electrolyte containing an organic solvent, at least one quaternary ammonium carboxylate, and a polymer including a polyether polyol represented by the following formula, as a skeletal structure, wherein a polyether portion of said polyether polyol is a random copolymer of oxyethylene and oxypropylene:

$$\begin{array}{l}CH_2-O-[(C_2H_4O)l_1-(C_3H_6O)m_1]n_1-R_1\\ CH-O-[(C_2H_4O)l_2-(C_3H_6O)m_2]n_2-R_2\\ CH_2-O-[(C_2H_4O)l_3-(C_3H_6O)m_3]n_3-R_3\end{array}$$

where, $l_1$, $l_2$, $l_3$, $m_1$, $m_2$, $m_3$, $n_1$, $n_2$ and $n_3$ are positive integers, and $2 \leq (l_1 + m_1) \times n_1 \leq 50$, $2 \leq (l_2 + m_2) \times n_2 \leq 50$ and $2 \leq (l_3 + m_3) \times n_3 \leq 50$, and $R_1$, $R_2$ and $R_3$ independently represents a hydrogen atom, which may be substituted one another by the same or different isocyanate residue or acrylic residue, wherein each end of the isocyanate residue or acrylic residue may be three-dimensionally linked.

12. An electrolytic capacitor in accordance with claim 10 or claim 11, wherein an organic solvent is at least one selected from the group consisting of monoethylene glycol, diethylene glycol, triethylene glycol, tetraethylene glycol, a polyethylene glycol, a polyalkylene glycol dimethylether, δ-butyrolactone, propylene carbonate, ethylene carbonate, dimethyl carbonate and dimethylethane.

13. An electrolytic capacitor in accordance with claim 10, wherein said quaternary ammonium borate is quaternary alkylammonium borate whose alkyl group having one to four carbon atoms.

14. An electrolytic capacitor in accordance with claim 10, wherein said quaternary ammonium phosphate is quaternary alkylammonium phosphate whose alkyl group having one to four carbon atoms.

15. An electrolytic capacitor in accordance with claim 10, wherein said ammonium carboxylate is an ammonium salt of an acid selected from the group consisting of adipic acid, azelaic acid and benzoic acid.

16. An electrolytic capacitor in accordance with claim 11, wherein said quaternary ammonium carboxylate is a quaternary alkylammonium salt of an acid selected from the group consisting of adipic acid, benzoic acid, azelaic acid and decandicarboxylic acid, and an alkyl group of said quaternery ammonium salt has from one to four carbon atoms.

* * * * *